(12) United States Patent
Raghunathan et al.

(10) Patent No.: US 8,751,877 B2
(45) Date of Patent: Jun. 10, 2014

(54) REPRESENTATION AND MANIPULATION OF ERRORS IN NUMERIC ARRAYS

(75) Inventors: Sudarshan Raghunathan, Cambridge, MA (US); C. David Callahan, II, Seattle, WA (US); Adam P. Jenkins, Marlborough, MA (US)

(73) Assignee: Microsoft Corporation, Redmond, WA (US)

(*) Notice: Subject to any disclaimer, the term of this patent is extended or adjusted under 35 U.S.C. 154(b) by 265 days.

(21) Appl. No.: 13/300,382

(22) Filed: Nov. 18, 2011

(65) Prior Publication Data
US 2013/0132783 A1 May 23, 2013

(51) Int. Cl.
*G06F 11/00* (2006.01)
(52) U.S. Cl.
USPC ............................................. 714/54; 714/20
(58) Field of Classification Search
USPC ................................. 714/20, 48, 54
See application file for complete search history.

(56) References Cited

U.S. PATENT DOCUMENTS

| | | | |
|---|---|---|---|
| 5,815,656 A * | 9/1998 | Candelaria et al. | 714/54 |
| 5,949,911 A * | 9/1999 | Chui et al. | 382/240 |
| 5,963,746 A * | 10/1999 | Barker et al. | 712/20 |
| 7,010,548 B2 * | 3/2006 | Jones et al. | 1/1 |
| 7,844,855 B2 * | 11/2010 | Shen et al. | 714/15 |
| 8,037,345 B1 * | 10/2011 | Iyer et al. | 714/6.12 |
| 8,170,491 B2 * | 5/2012 | Shuman et al. | 455/67.11 |
| 2004/0148324 A1 * | 7/2004 | Garg | 708/446 |
| 2004/0268068 A1 * | 12/2004 | Curran et al. | 711/162 |
| 2006/0050074 A1 | 3/2006 | Bassi | |
| 2008/0065953 A1 * | 3/2008 | Sun et al. | 714/757 |
| 2013/0166831 A1 * | 6/2013 | Atkisson et al. | 711/103 |

OTHER PUBLICATIONS

Anolick, et al., "The Characteristics of Alpha Particle Effects on 64K CCD'S", In Proceedings of International Electron Devices Meeting, vol. 25, 1979, pp. 625-628.
Lansel, et al., "Dictionaries for Sparse Representation and Recovery of Reflectances", In Proceedings of SPIE—IS&T, Computer Imaging VII, 2009, 11 pages.
Lastdrager, et al., "The Sparse-grid Combination Technique Applied to Time-dependent Advection Problems", In Proceedings of Applied Numerical Mathematics, vol. 38, 2001, 7 pages.
Lastdrager, et al., "Error Analysis for Function Representation by the Sparse-grid Combination Technique", Modelling, Analysis and Simulation, MAS-R9823 Oct. 31, 1998, 34 pages.

* cited by examiner

*Primary Examiner* — Yolanda L Wilson
(74) *Attorney, Agent, or Firm* — Kevin Sullivan; David Andrews; Micky Minhas

(57) ABSTRACT

In an embodiment, a computer system accesses various different data entries in dense data array, where at least one of those data entries in the dense data array is invalid. The computer system creates an associated sparse data array that includes multiple data entries with zero values as well as data entries with non-zero values. The non-zero data entries are configured to store location information and data values for each of the invalid data entries in the dense array. The zero-value data entries are inferred from the location information of the non-zero data entries. The computer system stores the location information and data values of the non-zero data entries in the sparse data array. Those data values stored in the sparse array are proportional to the number of invalid values in the dense array.

20 Claims, 5 Drawing Sheets

The Following Figures Illustrate The Construction Of Sparse Data Array For Views Into An Array A $$A = \begin{bmatrix} 0 & 4 & 8 & 12 & ⓖ \\ ① & ⑤ & ⑨ & ⑬ & 17 \\ 2 & ⑥ & 10 & ⑭ & 18 \\ ③ & 7 & ⑪ & 15 & ⑲ \end{bmatrix}$$

*A Prototypical 4x5 Matrix A With Error Values At The Circled Locations*

$$I_A = \{1,3,5,6,9,11,13,14,16,19\}$$

*Sparse Data Array For A Indicating Linear Locations In Memory Containing Error Values*

Figure 4A $$B = \begin{bmatrix} 0 & 4 & 8 \\ ① & ⑤ & ⑨ \\ 2 & ⑥ & 10 \end{bmatrix}$$

*View Into The Array A Constructed Using A[0:3,0:3]*

$$I_B = \{1,5,6,9\}$$

*Sparse Data Array Corresponding To The View*

Figure 4B $$B = \begin{bmatrix} ① & ⑨ & 17 \\ ③ & ⑪ & ⑲ \end{bmatrix}$$

View Into The Array A Constructed Using A[1:4:2,0:4:2]

$I_B = \{1,3,9,11,19\}$

Sparse Data Array Corresponding To The View

Figure 4C $$B = \begin{bmatrix} 8 & 4 & 0 \\ ⑨ & ⑤ & ① \\ 10 & ⑥ & 2 \end{bmatrix}$$

View Into The Array A Constructed Using A[0:3,2::-1]

$$INDX_B^A = \begin{bmatrix} 0 & -4 & -8 \\ 1 & -3 & -7 \\ 2 & -2 & -6 \end{bmatrix}$$

The Linear Offsets Into $D_A$ After Offsetting That Belong To B $I_B = \{1,-3,-2,-7\}$ Sparse Data Array Corresponding To The View

Figure 4D

REPRESENTATION AND MANIPULATION OF ERRORS IN NUMERIC ARRAYS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to work with and perform operations on large amounts of data. For instance, software applications may be designed to perform computational operations on large data arrays. These arrays may include various forms of information stored in different data types. Each portion of information stored in such data arrays is subject to error. For instance, arrays storing information from multiple sources may receive erroneous information from one (or more) of those sources. This erroneous information is stored in the array along with the other correct information. Checking for erroneous values one at a time in these large data arrays can be computationally expensive.

BRIEF SUMMARY

Embodiments described herein are directed to generating a sparse array to represent invalid values in a data array and to creating a view into a larger data array using a sparse data array. In one embodiment, a computer system accesses various different data entries in dense data array, where at least one of those data entries in the dense data array is invalid. The computer system creates an associated sparse data array that includes multiple data entries with zero values as well as data entries with non-zero values. The non-zero data entries are configured to store location information and data values for each of the invalid data entries in the dense array. The zero-value data entries are inferred from the location information of the non-zero data entries. The computer system then stores the location information and data values of the non-zero data entries in the sparse data array. Those data values stored in the sparse data array are proportional to the number of invalid values in the dense data array.

In another embodiment, a computer system creates a view into a larger data array using a sparse data array. The computer system creates a sparse data array that includes multiple data entries with zero values and data entries with non-zero values. The non-zero data entries are configured to store location information and data values for each of the invalid data entries in the dense array. The computer system receives an input from a user selecting a portion of the dense data array and translates the sparse data array to construct a view into the dense data array. The translation preserves the ordering of the sparse data array so that iterating over the data entries of the constructed view is equivalent to iterating over the original data entries of the dense data array.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which:

FIGS. 4A-4D illustrate embodiments of dense and sparse data arrays.

DETAILED DESCRIPTION

Figure 1:
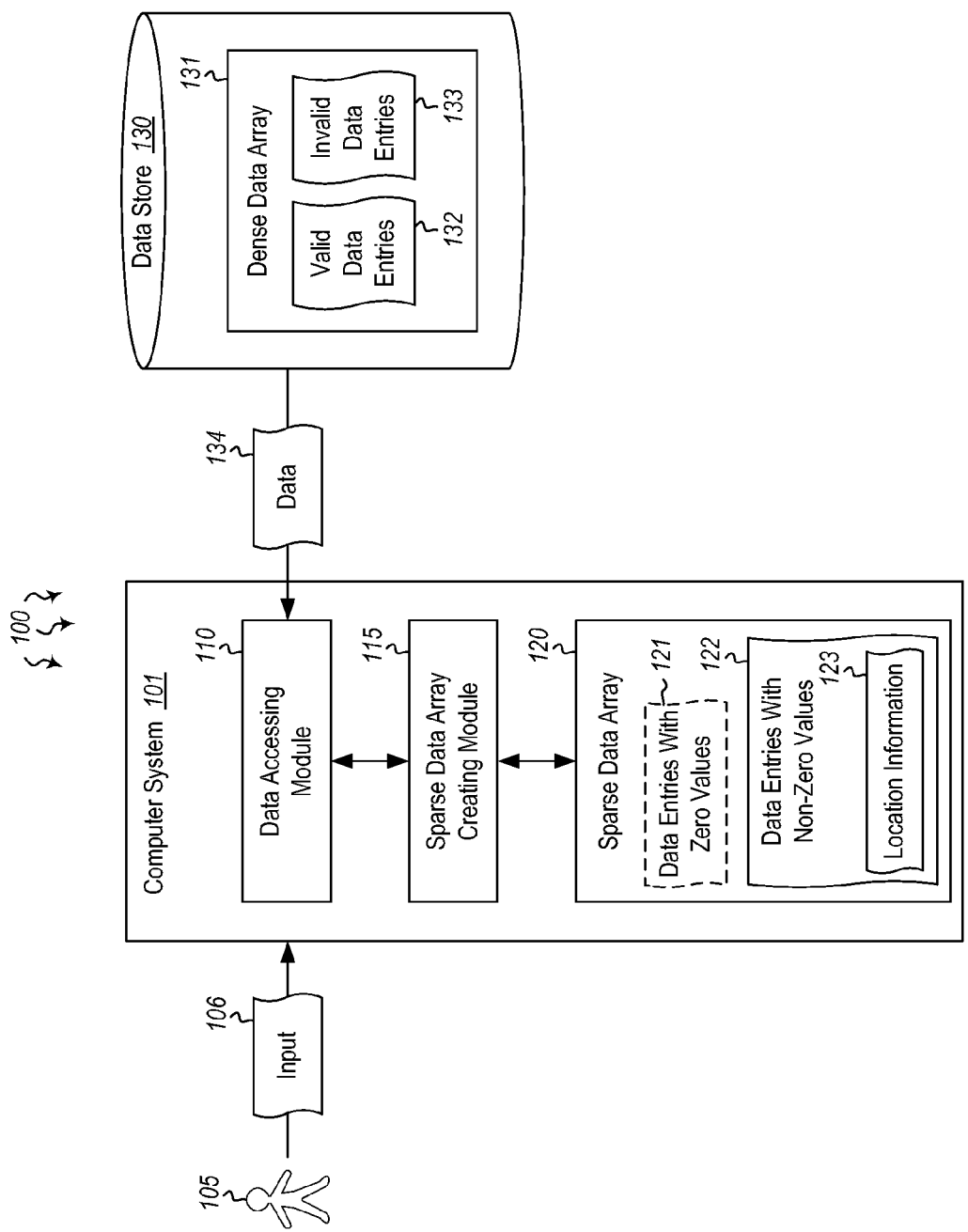
FIG. 1 illustrates a computer architecture in which embodiments of the present invention may operate including generating a sparse array to represent invalid values in a data array and creating a view into a larger data array using a sparse data array.

Embodiments described herein are directed to generating a sparse array to represent invalid values in a data array and to creating a view into a larger data array using a sparse data array. In one embodiment, a computer system accesses various different data entries in dense data array, where at least one of those data entries in the dense data array is invalid. The computer system creates an associated sparse data array that includes multiple data entries with zero values as well as data entries with non-zero values. The non-zero data entries are configured to store location information and data values for each of the invalid data entries in the dense array. The zero-value data entries are inferred from the location information of the non-zero data entries. The computer system then stores the location information and data values of the non-zero data entries in the sparse data array. Those data values stored in the sparse data array are proportional to the number of invalid values in the dense data array.

In another embodiment, a computer system creates a view into a larger data array using a sparse data array. The computer system creates a sparse data array that includes multiple data entries with zero values and data entries with non-zero values. The non-zero data entries are configured to store location information and data values for each of the invalid data entries in the dense array. The computer system receives an input from a user selecting a portion of the dense data array and translates the sparse data array to construct a view into the dense data array. The translation preserves the ordering of the sparse data array so that iterating over the data entries of the constructed view is equivalent to iterating over the original data entries of the dense data array.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 101. Computer system 101 may be any type of local or distributed computer system including a cloud computing system. The computer system includes various different modules configured to perform different types of functionality. For instance, data accessing module 110 may access data 134 from dense data array 131. The dense data array may be stored in a data store in computer system 101, or may be stored in a separate data store 130. The data store may be a local data store or a distributed data store, such as a storage area network (SAN).

The dense data array itself may be stored in a plurality of different locations, or in a single location (as illustrated in FIG. 1). The dense data array 131 may include a large amount of data stored in array or matrix form. As such, the data is stored in rows and columns. The data may be operated on individually or as a whole. The dense data array includes various types of data entries including entries that are valid (132) and entries that are invalid (133). The invalid entries may be missing entries or erroneous entries. The errors may come as the result of a malfunctioning sensor or due to some other irregularity or failure in how the data is captured and stored in the array. The invalid entries may constitute a small amount of the data entries in the data array. In most cases, the number of valid data entries will greatly exceed the number of invalid data entries.

In some embodiments, the coordinate (e.g. row-and-column) location of these invalid data entries may be stored in a separate data array. Sparse data array creating module 115 may create a sparse data array 120 that is configured to store the locations of the invalid data entries. Sparse data arrays, as defined herein, are arrays where the majority of the entries have values of zero. For instance, in one example, a dense array of 1000×1000 may have only 100 non-zero values. These non-zero values (or at least the location information for these values) are stored in the sparse data array 120. Accordingly, the sparse data array includes data entries with zero values 121, data entries with non-zero values 122 and location information 123 for those data entries with non-zero values.

In some embodiments, a dense multi-dimensional array A may be represented using two components: a one-dimensional data vector D consisting of all the values in the array, and a pair of one-dimensional vectors I and X of length $N_E$ where $N_E$ is the number of invalid entries in the array that indicate respectively the location and values of the invalid entries in the array. The one-dimensional vectors I and X comprise the "sparse data array" in A.

The array A can be a view into a larger array A'. In some cases, the process of creating views may involve reordering the elements in the sparse data array to account for views with negative strides into the original array. (As used herein, the stride refers to the combined number of data blocks in a range-partitioned flattened representation of the array that appear consecutively in multiple locales). The sparse data array for the view may be created in such a way that iterating over the view linearly involves linear iteration over the elements of the sparse data array. For example, if I(1) is the index into D of the first error value in A, then I(2) is the index of the second error value, even if A is a view into a larger array, A' with negative strides.

In many cases and for many applications, algorithms for operating on sparse data arrays (or sparse vectors) can be directly translated into algorithms for creating a sparse data array for an output array as a result of an operation on arrays with sparse data arrays. For example, adding two arrays A and B with sparse data arrays may be performed using a dense addition step consisting of the values in $D_A$ and $D_B$, followed by a sparse addition step that operates only on the entries in $I_A, X_A$ and $I_B, X_B$. Theoretical results governing the upper-bound on the number of non-zero entries in a sparse matrix operation may directly translate into the number of error values in the result of an operation of two arrays with sparse data arrays.

In some embodiments, the following assumptions may be taken into account: 1) sparse data arrays are read more often than they are written to (which is very similar to the set of assumptions made when creating certain compressed data structures to represent sparse matrices). Therefore, mutating a sparse data array is substantially more expensive than iterating over it. 2) sparse data arrays are optimized for linearly iterating over the elements of an array, irrespective of its dimensionality. Thus, random access through a sparse data array is at best $O(\lg N_E)$ and at worst $O(N_E) o(N_\delta)$ when an array is a view with negative strides into a contiguous array.

The dense array for an array A with N dimensions may include three fields: a vector S of length N containing the shape along each dimension, a vector S' of length N+1 containing the stride along each dimension and a vector D containing the data for the array stored in column major order. It should be noted that the stride vector S' can be signed to account for cases where an array is traversed in reverse order along a particular dimension.

The data vector has at least $$\prod_{i=1}^{N} S_t$$

elements, although in principle it can be much larger since A can be a "view" into a larger array and can therefore share the same data vector but index into only a portion of it. Further, the data vector can be of any one of the 15 classical primitive types (logical, single-byte character, two-byte character, eight signed and unsigned integer types, two Institute of Electrical and Electronics Engineers (IEEE) 754 floating point types and two IEEE 754 complex floating point types). Of these, only the two floating point and two complex floating point types allow the encoding of error and missing values as payloads in IEEE not-a-number constants.

The implementation of sparse data arrays for dense arrays augments the aforementioned array data structure with two arrays of length $N_E$: a vector I includes the locations in D which are interpreted as error values, and a vector X that contains the actual error value at that location. The actual value (be it a valid value or an error) at a given linear offset i is given by: $v=X[\epsilon]$ if $I[E]=i$ else $D[i]$.

In some embodiments, a sparse data array may be created using the following steps: first, the components I and X are created incrementally using a concurrent appendable data structure. Once the entries are created, the sparse data array is "committed" by traversing the elements of the underlying concurrent collection, sorting the entries in I in ascending order and creating the final I and X vectors. The process of incrementally creating and committing the sparse data array is abstracted into a data structure configured to store errors that exposes the incremental construction operations via application programming interfaces (APIs). Once the I and X vectors are created, they are attached to an existing dense array instance and replace any existing sparse data arrays for the dense array.

Note that, at least in some cases, the vectors are kept distinct (as opposed to having a single vector consisting of an index-value pair) to permit basic symbolic analysis to be performed on the locations in the array containing error values (for instance, replacing them with a canonical valid value, or for a multi-dimensional array, finding a pattern of distribution of invalid values, etc.) without necessarily iterating over the errors themselves. An alternate implementation may fuse together both the position and the value of the error into one element of the sparse data array 120.

One operation that may be performed on an array with a sparse data array is the construction of a view into it. A view A' into an array A is constructed whenever A is indexed using a regular indexing expression of the form $A(R_1, R_2, \ldots, R_N)$ where each range expression $R_i$ can be compactly represented by a triplet of start, end and skip values, respectively, $(I_i, J_i, K_i)$, $i=1, 2, \ldots, N$. The start and end indices satisfy the following constraints: $0 \leq I_i < S[i]$ and $0 \leq J_i \leq S[i]$. The skip value $K_i$ can have any non-zero integral value, but (at least in some cases) defaults to 1. The length of each element in the expression is given by $$L_i = \left\lceil \frac{J_i - I_i}{K_i} \right\rceil.$$

Creating a view of the form $B=A(R_1, R_2, \ldots, R_N)$ involves the following steps: 1) Compute the shape vector of the output $S_B = \{L_1, L_2, \ldots, L_N\}$, 2) compute the stride vector of the output $S'_B = \{K_1 \times S'_A[1], K_2 \times S'_A[2], \ldots K_N \times S'_A[N]\}$, and 3) compute the offset into the data vector D, $$\delta_B = \delta_A + \sum_{i=1}^{N} I_i \times S'_A[i].$$

When constructing a view of an array with a sparse data array configured to store errors, the following additional steps may be performed: 1) find the set of indices in $I_A$ that also belong to B under the indexing operation. This may be accomplished by decomposing each index $\epsilon$ in $I_A$ into its constituent coordinates, $(\epsilon_1, \epsilon_2, \ldots, \epsilon_N)$ and checking if each coordinate lies in the window defined by $[I_i, J_i]$ with a skip of $K_i$. 2) Offset the list of error indices $I_B$ using the offset $\delta_B$ computed above, and 3) sort the list of indices in $I_B$ such that if two indices $\epsilon$ and $\epsilon'$ are carried over from $I_A$ to $I_B$, they are ordered according to the dimension such that if $\epsilon$ occurs ahead of $\epsilon'$ in $I_A$, it occurs ahead of $\epsilon'$ in $I_B$ if and only if $K_i > 0$, $i=1, 2, \ldots N$. In some embodiments, the dimension sorting step is required to ensure that iterating linearly over the elements of B only requires incrementing the offsets in the sparse data array vectors $I_B$ and $X_B$. These concepts will be explained further below with regard to methods 200 and 300 of FIGS. 2 and 3, respectively.

Figure 2:
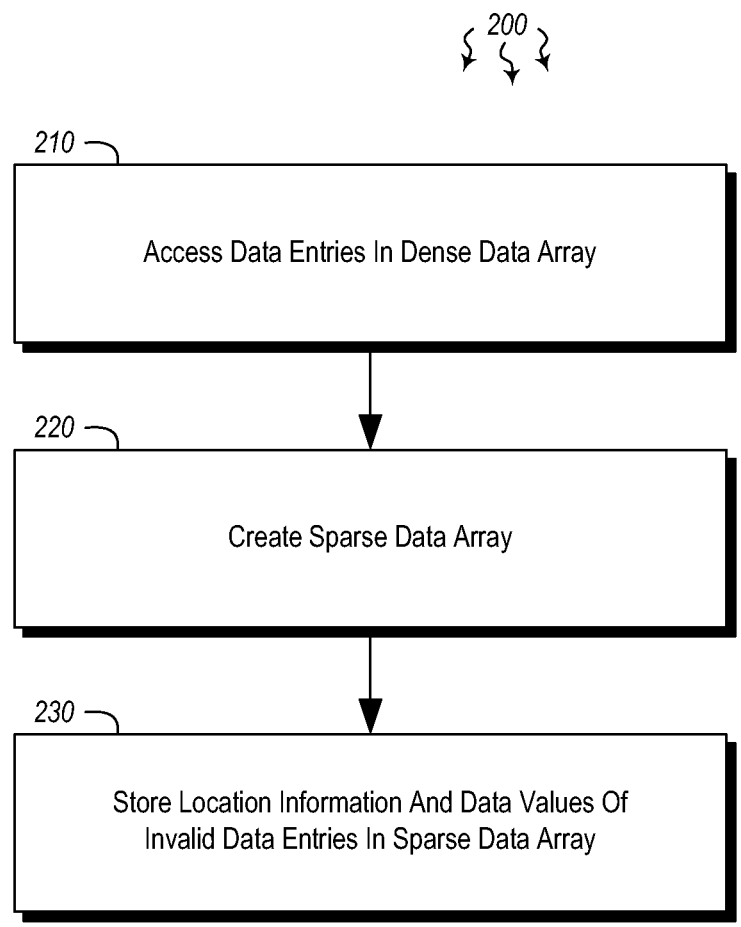
FIG. 2 illustrates a flowchart of an example method for generating a sparse array to represent invalid values in a data array.
Figure 3:
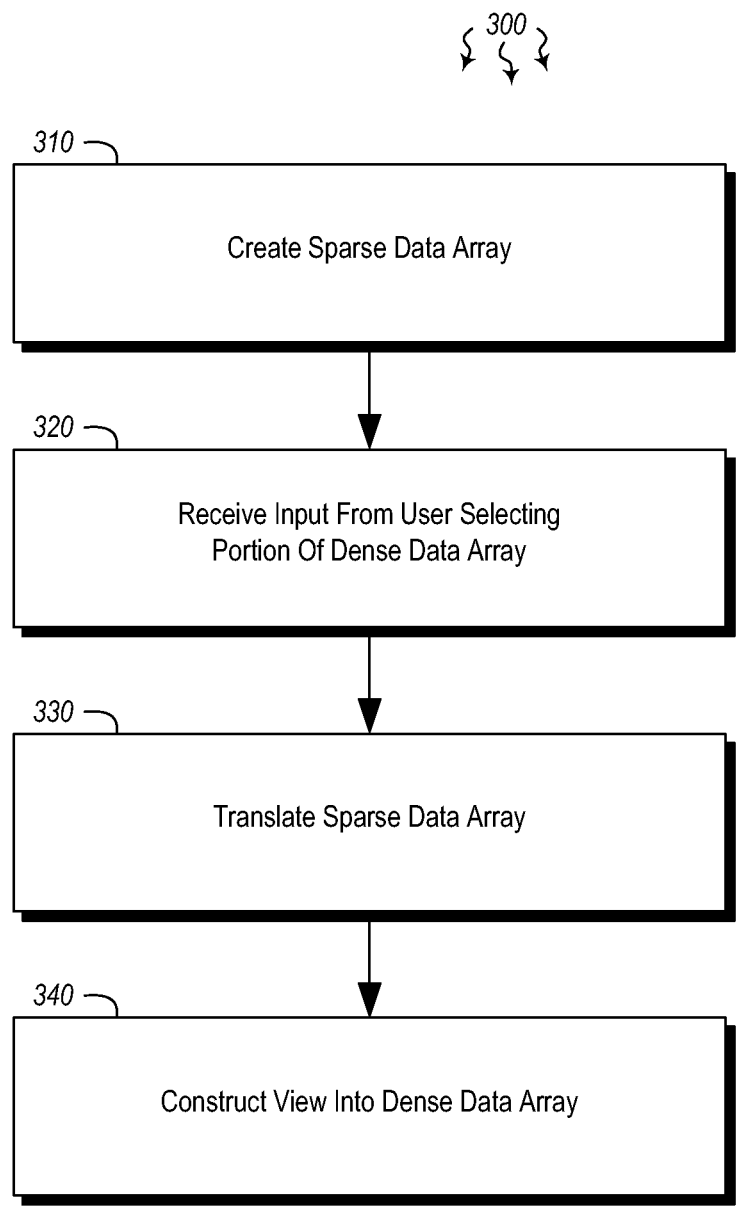
FIG. 3 illustrates a flowchart of an example method for creating a view into a larger data array using a sparse data array.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for generating a sparse array to represent invalid values in a data array. The method 200 will now be described with frequent reference to the components and data of environment 100.

Method 200 includes an act of accessing one or more data entries in dense data array, wherein at least one of the data entries in the dense data array is invalid (act 210). For example, data accessing module 110 may access data 134 which includes valid data entries 132 and invalid data entries 133 from dense data array 131. The dense data array is stored in data store 130, which may be a local or distributed storage system. The data of the dense array includes both valid and invalid data entries. The invalid data entries may be erroneous values, missing values or otherwise anomalous data values.

Method 200 also includes an act of creating an associated sparse data array that includes a plurality of data entries with zero values and data entries with non-zero values, wherein the non-zero data entries are configured to store location information and data values for each of the invalid data entries in the dense array, and wherein the zero-value data entries are inferred from the location information of the non-zero data entries (act 220). For example, sparse data array creating module 115 may generate sparse data array 120 which includes data entries with zero values 121, as well as data entries with non-zero values. The non-zero data entries store location information and/or data values for each data invalid data entry in the dense data array. The data entries with zero-values 121 are shown in dotted line form as they are not explicitly stored (at least in some cases). These values are inferred from (and indeed comprise) every space in the array not occupied by a non-zero value. Accordingly, if the non-zero value data entries are known, the zero value entries are also known (or are at least inferable from the location information of the non-zero values).

In some cases, the locations of invalid data entries 133 are stored in a flattened representation of the array. In such cases, the sparse data array is one-dimensional and is independent of the number of dimensions of the original array. The sparse data array 120 may include multiple one-dimensional vectors of length $N_E$, where $N_E$ is the number of invalid data entries in the dense data array. The one-dimensional vectors indicate the location and values of the invalid data entries in the dense data array. As explained above, the one-dimensional vectors may be kept distinct to allow symbolic analysis to be performed on the locations in the array that include invalid data entries. The symbolic analysis may include replacing the invalid data entries with one or more canonical valid values. Additionally or alternatively, the symbolic analysis may include finding a pattern of distribution of invalid data entries in a multi-dimensional data array. Such a pattern of invalid data entries may be found when a sensor has gone bad and is providing erroneous inputs, or when other invalid data is being provided to the dense array. Other patterns may be found when data entries have been deleted or are otherwise missing. It should be noted that the symbolic analysis may be performed without iterating over the invalid data entries themselves.

Method 200 next includes an act of storing the location information and data values of the non-zero data entries in the sparse data array, wherein the data values stored in the sparse data array are proportional to the number of invalid values in the dense data array (act 230). Location information 123 and data values may be stored for each non-zero data entry 122 in the sparse data array 120. The data values stored in the sparse array are proportional to the number of invalid data entries 133 in the dense data array 131.

Various different operations may be performed on the non-zero data entries 122. The number of these operations may be reduced to the number of non-zero entries. In addition to these operations, statistics may be provided indicating where in the dense data array the invalid data entries are located. For example, the statistics may indicate a particular row or column in which a certain number of invalid data entries occurs. Additionally or alternatively, the statistics may indicate clusters or other patterns of invalid data entries. Still further, the sparse data array may be scanned and any invalid data values may be replaced with valid data values at the locations specified in the sparse data array. This is referred to herein as substitution data filtering.

FIG. 3 illustrates a flowchart of a method 300 for creating a view into a larger data array using a sparse data array. The method 300 will now be described with frequent reference to the components and data of environment 100, as well as FIGS. 4A-4D.

Method 300 includes an act of creating a sparse data array that includes a plurality of data entries with zero values and data entries with non-zero values, wherein the non-zero data entries are configured to store location information and data values for each of the invalid data entries in the dense array (act 310). For example, sparse data array creating module 115 may create sparse data array 120. The sparse data array includes data entries with zero values and data entries with non-zero values. As explained above, the non-zero data entries store location information for each of the invalid data entries 133 of dense data array 131. In some cases, multiple processing threads may be implemented by the sparse data array creation module to construct the sparse data array in parallel. Once all of the processing threads are complete, the processes will commit and the array will be fully constructed.

The dense data array 131 may be stored as a long contiguous set of data in a flat data representation. As such, the indices in the sparse data array correspond to locations of invalid data entries in the flat data representation. It should be noted that the data entries in the sparse data array are independent of the number of dimension in the dense data array.

The data entries only depend on how many elements the array has and how many values are actually considered to be erroneous or missing values.

The computer system 101 may receive an input 106 from user 105 selecting a portion of the dense data array 131 (act 320). The computer system may then translate the sparse data array to construct a view into the dense data array (act 330). It should be noted that, at least in some case, act 330 may be split into two different acts (330 and 340) where the translation occurs substantially in act 330, while the construction of the view occurs substantially in act 340. Translation of the sparse data array preserves its ordering, such that iterating over the data entries of the constructed view is equivalent to iterating over the original data entries of the dense data array. Examples of views created by translation are shown in FIGS. 4A-4D.

For instance, FIG. 4A shows the construction of sparse data arrays for views into Array A. This example array includes error values, which are circled for easy identification. In this case, the side structure I for array A ($I_A$) would include values 1, 3, 5, 6, 9, 11, 13, 14, 16 and 19. These are the linear locations in memory that contain error values. As shown in FIG. 4B, a 3×3 view into array A may include the values shown in array B, where the side structure of array B ($I_B$) includes error values 1, 5, 6 and 9. An alternative view may be created into array A, as shown in FIG. 4C. In FIG. 4C, the view includes values from array A taken from rows 2 and 4, columns 1, 3 and 5. The resulting view for the sparse data structure includes values 1, 3, 9, 11, 17 and 19, where values 1, 3, 9, 11 and 19 are erroneous values. FIG. 4D illustrates another view into array A which is 3×3, but is the inverse of the view created in FIG. 4B. Index AB illustrates the linear offsets into $D_A$ after offsetting, as explained above. The sparse array for this view would thus include values 1, −3, −2 and −7 (see $I_B$ in FIG. 4B).

Accordingly, methods, systems and computer program products are provided which generate a sparse array to represent invalid values in a data array. Moreover, methods, systems and computer program products are provided which creates a view into a larger data array using a sparse data array.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for generating a sparse array to represent invalid values in a data array, the method comprising:
    an act of accessing one or more data entries in dense data array, wherein at least one of the data entries in the dense data array is invalid;
    an act of creating an associated sparse data array that includes a plurality of data entries with zero values and data entries with non-zero values, wherein the non-zero data entries are configured to store location information and data values for each of the invalid data entries in the dense array, and wherein the zero-value data entries are inferred from the location information of the non-zero data entries; and
    an act of storing the location information and data values of the invalid data entries in the sparse data array, wherein the data values stored in the sparse data array are proportional to the number of invalid values in the dense data array.

2. The method of claim 1, wherein the locations of invalid data entries are stored in a flattened representation of the array, such that the sparse data array is one-dimensional and is independent of the number of dimensions of the original array.

3. The method of claim 1, wherein the invalid values comprise error values.

4. The method of claim 1, wherein the invalid values comprise missing values.

5. The method of claim 1, wherein one or more operations are to be performed on the invalid data entries.

6. The method of claim 5, wherein the number of operations to be performed is reduced to the number of non-zero entries.

7. The method of claim 1, further comprising providing one or more statistics indicating where in the dense data array the invalid data entries are located.

8. The method of claim 1, wherein the sparse data array comprises a plurality of one-dimensional vectors of length $N_E$, where $N_E$ comprises the number of invalid data entries in the dense data array.

9. The method of claim 8, wherein the one-dimensional vectors indicate the location and values of the invalid data entries in the dense data array.

10. The method of claim 8, wherein the plurality of one-dimensional vectors are kept distinct to allow symbolic analysis to be performed on the locations in the array that include invalid data entries.

11. The method of claim 10, wherein the symbolic analysis comprises replacing the invalid data entries with one or more canonical valid values.

12. The method of claim 10, wherein the symbolic analysis comprises finding a pattern of distribution of invalid data entries in a multi-dimensional data array.

13. The method of claim 10, wherein the symbolic analysis is performed without iterating over the invalid data entries themselves.

14. The method of claim 1, further comprising scanning the sparse data array and replacing invalid data values with valid data values at the locations specified in the sparse data array to perform substitution data filtering.

15. A computer program product for implementing a method for creating a view into a larger data array using a sparse data array, the computer program product comprising one or more computer-readable storage devices having stored thereon computer-executable instructions that, when executed by one or more processors of the computing system, cause the computing system to perform the method, the method comprising:
    an act of creating a sparse data array that includes a plurality of data entries with zero values and data entries with non-zero values, wherein the non-zero data entries are configured to store location information and data values for each of the invalid data entries in the dense array;
    an act of receiving an input from a user selecting a portion of the dense data array;
    an act of translating the sparse data array to construct a view into the dense data array, wherein the translation preserves the ordering of the sparse data array such that iterating over the data entries of the constructed view is equivalent to iterating over the original data entries of the dense data array.

16. The computer program product of claim 15, wherein multiple processing threads are implemented to construct the sparse data array in parallel.

17. The computer program product of claim 15, wherein the dense data array is stored as a long contiguous set of data in a flat data representation, such that the indices in the sparse data array correspond to locations of invalid data entries in the flat data representation.

18. The computer program product of claim 15, wherein the data entries in the sparse data array are independent of the number of dimension in the dense data array.

19. A computer system comprising the following:
one or more processors;
system memory;
one or more computer-readable storage media having stored thereon computer-executable instructions that, when executed by the one or more processors, causes the computing system to perform a method for generating a sparse array to represent invalid values in a data array, the method comprising the following:
an act of accessing one or more data entries in dense data array, wherein at least one of the data entries in the dense data array is invalid;
an act of creating an associated sparse data array that includes a plurality of data entries with zero values and data entries with non-zero values, wherein the non-zero data entries are configured to store location information and data values for each of the invalid data entries in the dense array, wherein the locations of invalid data entries are stored in a flattened representation of the array, such that the sparse data array is one-dimensional and is independent of the number of dimensions of the original array;
an act of storing the location information and data values of the non-zero data entries in the sparse data array, wherein the data values stored in the sparse data array are proportional to the number of invalid values in the dense data array; and
an act of providing one or more statistics indicating where in the dense data array the invalid data entries are located.

20. The computer system of claim 19, wherein the sparse data array comprises a plurality of one-dimensional vectors of length $N_E$, where $N_E$ comprises the number of invalid data entries in the dense data array, the one-dimensional vectors indicating the location and values of the invalid data entries in the dense data array.

* * * * *